United States Patent [19]

Trower

[11] 3,911,532

[45] Oct. 14, 1975

[54] AUTOMOTIVE TRIM STRIP FASTENER

[76] Inventor: Donald Trower, 3069 N. Parkview Drive, Fresno, Calif. 93705

[22] Filed: May 21, 1974

[21] Appl. No.: 472,056

[52] U.S. Cl. .............................................. 24/73 BC
[51] Int. Cl.² ........................................ A44B 21/00
[58] Field of Search ........ 24/73 BC, 73 MF, 73 PM, 24/73 HS

[56] References Cited
UNITED STATES PATENTS

| 2,695,435 | 11/1954 | Bedford | 24/73 BC |
| 2,796,647 | 6/1957 | Bedford | 24/73 HS |
| 3,047,919 | 8/1962 | Scott | 24/73 BC |
| 3,279,013 | 10/1966 | Fiddler | 24/73 BC |

FOREIGN PATENTS OR APPLICATIONS

| 891,032 | 3/1962 | United Kingdom | 24/73 BC |

Primary Examiner—Geo. V. Larkin
Attorney, Agent, or Firm—John P. Snyder

[57] ABSTRACT

The body and tail of a trim strip fastener form a vee so that a relatively few standard sizes of fasteners can accommodate a wide range of trim strip widths. Opposite ends of the fastener body can come into the trim strip channels under the resilient action of the tail and the fastener is easily made from flat metal stock.

2 Claims, 7 Drawing Figures

AUTOMOTIVE TRIM STRIP FASTENER

BACKGROUND OF THE INVENTION

Many different types of automotive trim strip fasteners have been developed and utilized over the years but there is an ever-present need for improvements in such fasteners.

Such fasteners must be easily applied and yet they must be fully effective to retain the position to which they are inserted in the channel of the trim strip and to operate in conjunction with the spring clip device with which they are used firmly and snugly to hold the trim strip against the automotive body. At the same time, such devices must be economical of manufacture and in particular must be so designed as to be particularly suited for mass production with a minimum of complexity of the operations in forming them.

BRIEF SUMMARY OF THE INVENTION

It is accordingly of primary concern in connection with the present invention to provide an improved form of automotive trim strip fastener which may be simply and economically made with singular lack of complexity in the forming process and yet which provides an efficient and effective fastening assembly for automotive trim strip.

Basically, the objectives according to the present invention are achieved by virtue of utilizing a body member-tail piece assemblage of unitary configuration which may be easily stamped from flat metal stock and in which the tail piece is bent to reside in a plane at right angles to the plane of the body member to provide a resilient V-shaped configuration therewith serving effectively and efficiently to spring load the assembly within the channel of an automotive trim strip or molding.

Further, the present invention is characterized by the fact that the body member is provided with a central opening surrounded by a depressed area and which opening freely and rotatably receives a spring clip device for cooperation with a prelocated opening in the automotive body.

BRIEF DESCRIPTION OF THE DRAWING FIGURES

DETAILED DESCRIPTION OF THE INVENTION

Figure 1:
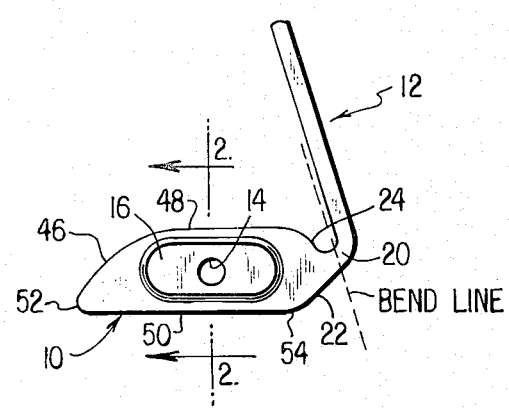
FIG. 1 is a plan view of a fastener according to the present invention during the formation process thereof.

Referring at this time more particularly in FIG. 1, a fastener according to the present invention is shown therein during the process of manufacture. In FIG. 1, the fastener will be seen to include a body member indicated generally by the reference character 10 and a tail piece indicated generally by the reference character 12. These two portions of the assembly are fabricated from a suitable thin stock and during the initial forming process which shapes a piece, a central opening 14 may be also punched out and, additionally, an outwardly deformed portion 16 may be formed in the central region of the body member 10 surrounding the opening 14, substantially as is shown.

Figure 2:
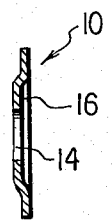
FIG. 2 is a vertical section taken substantially along the plane of section line II—II.

FIG. 2 shows the depression 16 more clearly.

The tail piece will be seen preferably to be in the form of an elongate, narrow strip which joins one end of the body member 10 in the laterally offset neck portion 20. The corresponding end of the body member 10 has an upwardly sloping end edge 22 and a downwardly sloping end edge 24 merging toward and joining to the neck 20 in smooth fashion as is shown and in a final stage of the formation of the finished product which is illustrated in FIG. 7, the tail piece is twisted out of the plane of the body portion 10 along the bend line as is indicated in FIG. 1 so that, as is illustrated in FIG. 7, the tail piece 12 now lies in a plane substantially at right angles to the plane of the body member 10.

Figure 7:
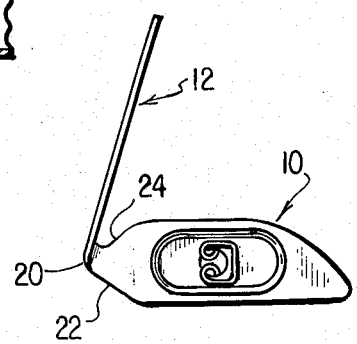
FIG. 7 is a plan view of the finished fastener with spring clip assembled thereto.

It will be seen from FIGS. 1 and 7 that the body member 10 and tail piece 12 define a V shape with an included angle of substantially 90° and the tail piece 12 is a length substantially equal to the length of the body member 10 for purposes which will be presently apparent.

Figure 3:
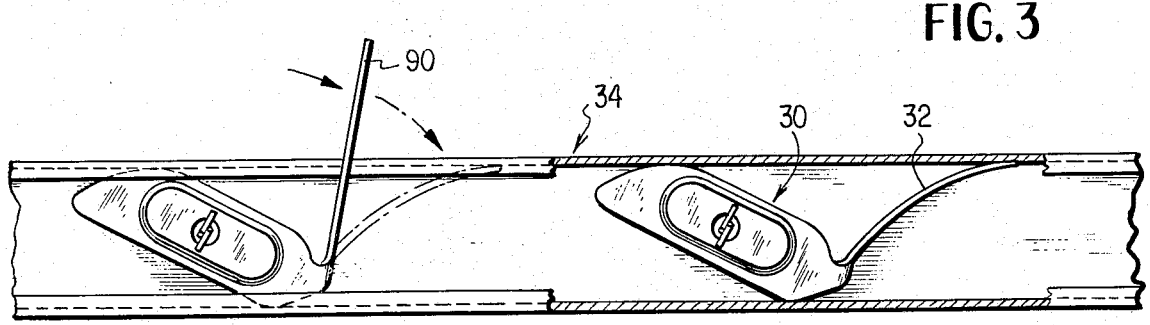
FIG. 3 is a view, partially broken away showing two of the fasteners one of which is operatively associated with a trim strip and the other of which illustrates a manner in which same can be engaged with the trim strip.
Figure 4:
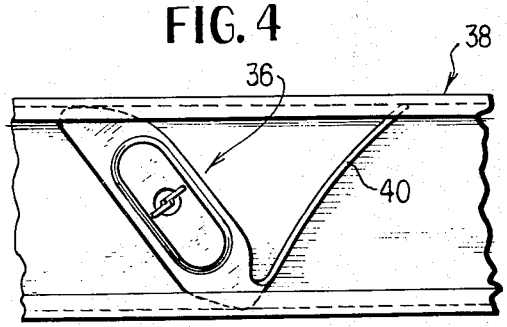
FIG. 4 is a view similar to FIG. 3 but showing the capability of the fastener properly to fit within a wider trim strip.
Figure 5:
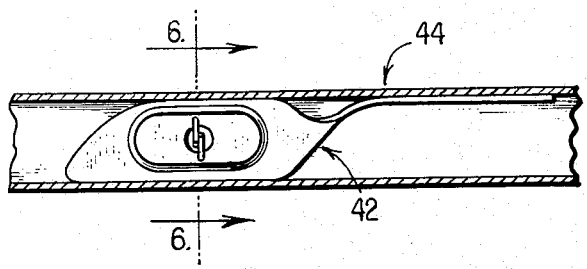
FIG. 5 is a view similar to FIGS. 3 and 4 but illustrating the fastener used in the minimum width trim strip with which it can be associated.

It is a feature of the present invention that one particular size of fastener is capable of fitting a wide range of trim strip width sizes and this is illustrated in FIGS. 3-5 inclusive. Thus, a relatively few standard size fasteners may be manufactured to fit all existing sizes of trim strips. In the right-hand side of FIG. 3, an intermediate width of trim strip corresponding to the size of the fastener is illustrated with a fastener 30 in place. In the particular instance shown, the V shape of the member 30 with its tail piece 32 has been moderately spread from the unflexed position shown in FIG. 7 and the body portion of the member 30 extends diagonally across the width of the channel of the automotive trim strip 34 within which it is fitted. In FIG. 4, the fastener assembly 36 is shown fitted in a still wider trim strip 38, in which case the V shape defined between the body member and the tail piece 40 is only moderately spread. Finally, as is shown in FIG. 5, the fastener assembly 42 is illustrated in the narrowest trim strip 44 within which it can be accommodated.

The body member 10 as shown in FIG. 1 has an end edge 46 of arcuate configuration and which merges smoothly with the upper edge portion 48 of the body member and slopes downwardly in tapering fashion toward the bottom or lower edge 50 of the body portion to merge smoothly therewith in the rounded nose portion 52 as is shown. The top and bottom edges 48 and 50 are essentially parallel to each other and are of straight line configuration and the width of the body member 10 defined between them determines the minimum width of the trim strip within which the fastener element may be utilized, as is illustrated in FIG. 5. The tapering end portion of the body member 10, on the other hand, provides a smooth camming action of the body member within its respective trim strip wherein same is of wider width than is shown in FIG. 5 as, for example, in FIGS. 3 and 4. As the trim strips become wider, the body member begins to rotate from the position shown in FIG. 5 and begins to bridge on the rounded heel portion 54 and a diametrically opposed portion of the edge 46 as can be clearly seen in FIGS. 3 and 4 and the point of contact between the body member and the channels of the trim strip gradually work their way up the end edge 22 and down the end edge 46. During all this time, the fastener is securely held in the channel of the trim strip and this is illustrated more clearly in FIG. 6.

Figure 6:
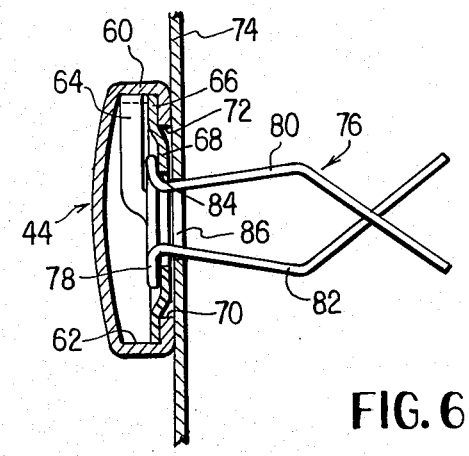
FIG. 6 is an enlarged vertical section taken substantially along the plane of section line VI—VI in FIG. 5.

In FIG. 6, the trim strip 44 will be seen to include top and bottom channels 60 and 62 within which the fastener is fitted. The tail piece 64 is of a width less than the width of its corresponding channel part 60 but together with the body portion 66 substantially fills the channel 60 as is clearly illustrated. FIG. 6 also illustrates that the depression 68 fits between the flange edges 70 and 72 of the trim strip and resides in a position closely adjacent to the outer surface of the automotive body panel 74 with which the trim strip 44 is to be associated. FIG. 6 also illustrates a conventional form of spring clip 76 which has a head portion 78 lying within the depression 68 and spring clip legs 80 and 82 which are projected through the central opening 87 in the body member and through the opening 86 provided in the vehicle body panel 74. The clip assembly 76 serves to hug the fastener and the trim strip tightly against the body.

Once the fastener is in place within the trim strip channel, it tends to hold itself in place but the spring clip 76 is freely rotatable so as not to interfere with the action of the fastener in properly aligning itself within the trim strip channels.

FIG. 3 on the left-hand side illustrates one way in which a fastener may be inserted into a trim strip simply by placing the body portion within the channels and then bending the tail piece 90 downwardly as shown to engage beneath and then into the channel of the trim strip 34.

What is claimed is:

1. An automotive trim strip fastener comprising, in combination:

a substantially flat body member of thin stock having a centrally disposed opening and a tapered end portion, said body member having a substantially flat upper edge and a substantially flat lower edge, said upper and lower edges being substantially parallel, said body member having an arcuate end edge curving downwardly from said upper edge substantially to said lower edge and having a rounded nose smoothly merging said arcuate end edge with said lower edge, that end of said body member opposite said tapered end portion having a first end edge sloping downwardly from said upper edge and a second edge sloping upwardly from said lower edge, said first and second end edges defining a neck between them, and a tail piece integrally joined with said neck and projecting laterally upwardly with respect thereto so that said tail piece and said body member define a V-shape, said tail piece being of a length substantially equal to that of said body member and being integrally joined with said neck portion along a bend line extending transversely of said neck portion such that said tail piece lies in a plane substantially perpendicular to a second plane containing said body member and is offset to one side of said second plane, and the central region of said body member surrounding said central opening being deformed outwardly from said second plane to that side thereof opposite the one side to which said tail piece is offset; and a wire clip assembly engaged through said central opening, said wire clip assembly having a head portion seated within the depression provided by the deformed central region and including resilient legs projecting through said central opening.

2. An automotive trim strip fastener as defined in claim 1 in combination with a trim strip, said trim strip having upper and lower sides of U-shaped cross section to present corresponding upper and lower interior channels and upper and lower inner side flanges having spaced, parallel edges, said deformed central region of the body member being dimensioned to fit between said parallel edges of the inner side flanges and being offset from said second plane by an amount less than the thickness of said inner side flanges, and the width of the tail piece together with its degree of offset relative to the body member and the thickness of said body member being such as substantially to fill an interior channel of the trip strip.

* * * * *